US011964628B2

(12) United States Patent
Morphy

(10) Patent No.: US 11,964,628 B2
(45) Date of Patent: Apr. 23, 2024

(54) MULTI-LOCK VEHICLE THEFT PREVENTION DEVICE AND SYSTEM

(71) Applicant: Gary Morphy, Cambridge (CA)

(72) Inventor: Gary Morphy, Cambridge (CA)

(*) Notice: Subject to any disclaimer, the term of this patent is extended or adjusted under 35 U.S.C. 154(b) by 506 days.

(21) Appl. No.: 17/346,748

(22) Filed: Jun. 14, 2021

(65) Prior Publication Data

US 2021/0300296 A1 Sep. 30, 2021

Related U.S. Application Data

(63) Continuation of application No. PCT/IB2019/060964, filed on Dec. 17, 2019.

(60) Provisional application No. 62/780,996, filed on Dec. 18, 2018.

(51) Int. Cl.
*B60R 25/022* (2013.01)
*B60R 25/102* (2013.01)

(52) U.S. Cl.
CPC ........ *B60R 25/0221* (2013.01); *B60R 25/102* (2013.01)

(58) Field of Classification Search
CPC .............. B60R 25/022; B60R 25/0221; B60R 25/0225; B60R 25/0227; B60R 25/0228; B60R 25/102
See application file for complete search history.

(56) References Cited

U.S. PATENT DOCUMENTS

| | | | | |
|---|---|---|---|---|
| 5,461,891 A | * | 10/1995 | Noel | B60R 25/0221 70/237 |
| 5,826,448 A | * | 10/1998 | Graham | B60R 25/023 70/237 |
| 6,028,268 A | * | 2/2000 | Stark | H02B 1/50 174/67 |
| 6,516,642 B1 | * | 2/2003 | Vito | B60R 25/0221 70/237 |

* cited by examiner

*Primary Examiner* — Christine M Mills
*Assistant Examiner* — Yahya Sidky
(74) *Attorney, Agent, or Firm* — PatentFile, LLC; Bradley C. Fach; Steven R. Kick

(57) ABSTRACT

A multi-lock vehicle theft prevention system and device are provided. The system may include an electronic device in communication with a wireless network and a multi-lock vehicle theft prevention device for use with a vehicle. The device may include a major cover and a minor cover. The first cover and the second cover may be configured to encircle a control housing, or other portion of a vehicle or other possession, positioned between the first cover and second cover and a lock bar may be configured to removably couple the first cover and second cover together.

19 Claims, 11 Drawing Sheets

MULTI-LOCK VEHICLE THEFT PREVENTION DEVICE AND SYSTEM

CROSS REFERENCE TO RELATED APPLICATIONS

This application claims priority to and the benefit of the filing date of international application no. PCT/IB2019/060964, filed on Dec. 17, 2019 which in turn claims priority to and the benefit of the filing date of U.S. Provisional Application No. 62/780,996, filed on Dec. 18, 2018, entitled "Multi-Lock Vehicle Theft Prevention Device and System (MVTPDS)", which is hereby incorporated by reference in its entirety.

FIELD OF THE INVENTION

This patent specification relates to the field of devices and systems configured to prevent vehicle theft. More specifically, this patent specification relates to devices and systems configured to prevent vehicle theft by preventing access to one or more elements of a vehicle.

BACKGROUND

Stealing vehicles has been a problem for as long as they have existed. Over the more than 100 years since they've become common, owners have kept them inside, blocked in by something else, like another vehicle, or locked in an effort to prevent theft. Theft very often occurs because the owners doesn't keep the vehicle locked, sometimes leaving it running or the keys in it or doesn't add a theft deterrent device. Even when it is locked, often a vehicle can be stolen in a very short time when a thief knows its weaknesses and usually is a big factor in determining what vehicle they are targeting. These weaknesses in the vehicle design facilitate, for example, quickly breaking the door lock and ignition switch to get into the vehicle and start without a key with very simple tools. This flawed, ineffective resistance to vehicle theft is fundamentally why theft prevention products have been and are needed.

Many products have been designed to deter thieves from stealing vehicles when they are left unattended. Existing types include steering wheel locks, alarms, monitors, kill switches, external wheel/tire locks, engine immobilizers and GPS locators coupled with services like On-Star or Lojack. All current devices offer one active aspect or type of protection to prevent a thief from stealing the vehicle, with varying effectiveness. The prevalent singular active aspect or type of protection makes stealing easier. The thief can focus on that one thing and as a result can may learn to easily break it, often in 1 minute or less, allowing the thief to quickly drive the vehicle away, with minimal probability of detection or getting caught, which is what the thief depends on. Despite security cameras and increased vigilance by vehicle owners, there is often too little information or evidence for police to pursue and apprehend the thief.

Most products aim to prevent a theft attempt by using window stickers or a small light to warn that a theft deterrent is inside, to try to make them think it's easier for them to move on to an unprotected, easier target. This is the best possible outcome for the owner because, even when the vehicle isn't taken, the damage the thief causes can cost a few hundred to more than $1000, depending on if the owner pays someone to do the work. It often comes out of the owner's pocket, because when they consider insurance deductible, the consequences of submitting a claim and other possible detriments, an insurance claim usually isn't sensible. These deterrents are relatively passive and won't work if a thief doesn't see it before breaking in or knows how to circumvent the product quickly.

The fundamental purpose of most products is preventing the thief from driving away, by blocking that in one way, like locking the steering wheel, sounding an alarm or locking one of the tires. A few others will track the vehicle after it's been stolen.

In all cases some of the vehicle owner's personal information (ownership, insurance and possibly more) is easily accessible for a thief to take while stealing the vehicle or even a simple smash and grab of vehicle contents only, so they can steal from their living space or for identity theft of or fraud, days, weeks or even months later.

More recently the prevalence of keyless entry, proximity entry systems and start buttons replacing the ignition switch have been promoted by vehicle manufacturers as improving convenience for the owner, while substantially improving vehicle security. This approach removes some of the weaknesses mentioned above, seeming to make it much tougher for a thief to steal a vehicle. The reality is that the vehicle theft community has responded by developing or buying devices and methods devised by others to detect and copy the signals from the owner's key fob or hack the computer in your vehicle in various ways to steal it. This can be an easier, faster and more subtle way of breaking into a car than the older vehicles. Some of these are:

Steal the key/fob from the owner's dwelling, often left in the open, at the front door.
    Access the vehicle computer through the On-Board Diagnostics (OBD) port, which most people associate with service diagnostics.
    Detect the signal from the owner's key fob, when they're walking away from their vehicle or possibly even if it's still in the house and duplicate it electronically very quickly. The vehicle's security system thinks the thieves' device, which relays the signal from the owners fob, is the real thing. Therefore, they can unlock and start the vehicle without a real key or fob, making it even easier and faster for a knowledgeable, equipped thief to steal.

Device cost plays a role in vehicle theft prevention. Engine immobilizers are quite effective but cost exceeding $1000 is higher than many owners are willing to pay. Other devices cost less and look sturdy but may provide surprisingly little resistance. Owner behavior like leaving the vehicle running or the keys in it and not buying a device to prevent theft are part of why theft is as common as it is. Frequent reasons owners don't take added steps to prevent theft are an elevated sense of security in the original equipment manufacturer (OEM) system, not wanting the hassle of retrieving the device and locking up when leaving the vehicle and stowing the device when returning to drive or simply relying on insurance to pay for damage, partial or total loss.

This situation where the vehicle design offers little resistance and adding a vehicle theft prevention device doesn't provide much more, means a more effective vehicle theft prevention device system is needed. It needs to provide:
    As many types or aspects of protection as possible
    A design that is strong and practically impossible to break.
    Easy and quick to lock and unlock, as well as small and easy or unnecessary to stow when driving
    Keep personal information secure Cost effectivity, offering good value via extensive, strong and highly effective theft barriers for the money being paid.

Therefore, novel devices and systems configured to prevent vehicle theft are needed.

BRIEF SUMMARY OF THE INVENTION

A multi-lock vehicle theft prevention device and system are provided which combines many aspects of protection, which completely prevents or at least, dramatically increases the time needed to try to break it, which will lead to thieves avoiding it, making a much more effective deterrent. The main device is a very visible deterrent, identifying the type of device. It is complex and tough to break, including, in its fullest form, preferably locks on to different vehicle controls or other physical elements of a vehicle or other possession that a user desires to protect from theft.

According to one aspect consistent with the principles of the present invention, a multi-lock vehicle theft prevention device for use with a vehicle is provided. In some embodiments, the device may include a major cover and a minor cover. The major cover may have a first end, a second end, and a lock aperture, and a minor cover may have a third end and a fourth end. A hinge may couple the first end and third end together. One or more major rings, each having a major aperture, may be coupled to the second end. One or more minor rings, each having a minor aperture, may be coupled to the fourth end. The device may further include a lock bar having a crossbar, a first leg, and a second leg, and the crossbar may couple the first leg and second leg together. The first leg may be configured to be removably received in the lock aperture, and the second leg may be configured to be removably received in the major aperture(s) and minor aperture(s) The second leg may couple the second end to the fourth end when the second leg is received in the major aperture and minor aperture. The first cover and the second cover may be configured to encircle a control housing, such as a steering column housing, or other portion of a vehicle or other possession, positioned between the first cover and second cover when the second end is coupled to the fourth end, and the second end and fourth end may be separable when the second leg is not received in the major aperture and minor aperture. A lock may be configured to govern the ability of the second leg to be removed from the major aperture and minor aperture.

According to another embodiment consistent with the principles of the present invention, a multi-lock vehicle theft prevention system is provided. In some embodiments, the system may include an electronic device in communication with a wireless network and a multi-lock vehicle theft prevention device for use with a vehicle. In further embodiments, the system may include a multi-lock vehicle theft prevention device in direct communication with an electronic device, such as via Bluetooth or other communication protocols. The device may include a major cover and a minor cover. The major cover may have a first end, a second end, and a lock aperture, and a minor cover may have a third end and a fourth end. A hinge may couple the first end and third end together. One or more major rings, each having a major aperture, may be coupled to the second end. One or more minor rings, each having a minor aperture, may be coupled to the fourth end. The device may further include a lock bar having a crossbar, a first leg, and a second leg, and the crossbar may couple the first leg and second leg together. The first leg may be configured to be removably received in the lock aperture, and the second leg may be configured to be removably received in the major aperture(s) and minor aperture(s) The second leg may couple the second end to the fourth end when the second leg is received in the major aperture and minor aperture. The first cover and the second cover may be configured to encircle a control housing, such as a steering column housing, or other portion of a vehicle or other possession, positioned between the first cover and second cover when the second end is coupled to the fourth end, and the second end and fourth end may be separable when the second leg is not received in the major aperture and minor aperture. A lock may be configured to govern the ability of the second leg to be removed from the major aperture and minor aperture. A processing unit may be in communication with a motion sensor and a radio, the radio enabling communication with the electronic device via the wireless network, and the motion sensor configured to detect motion of the device. The processing unit may be configured to communicate information describing the motion of the device to the electronic device operated by a user, owner, police agency, security organization, or other individual or entity.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
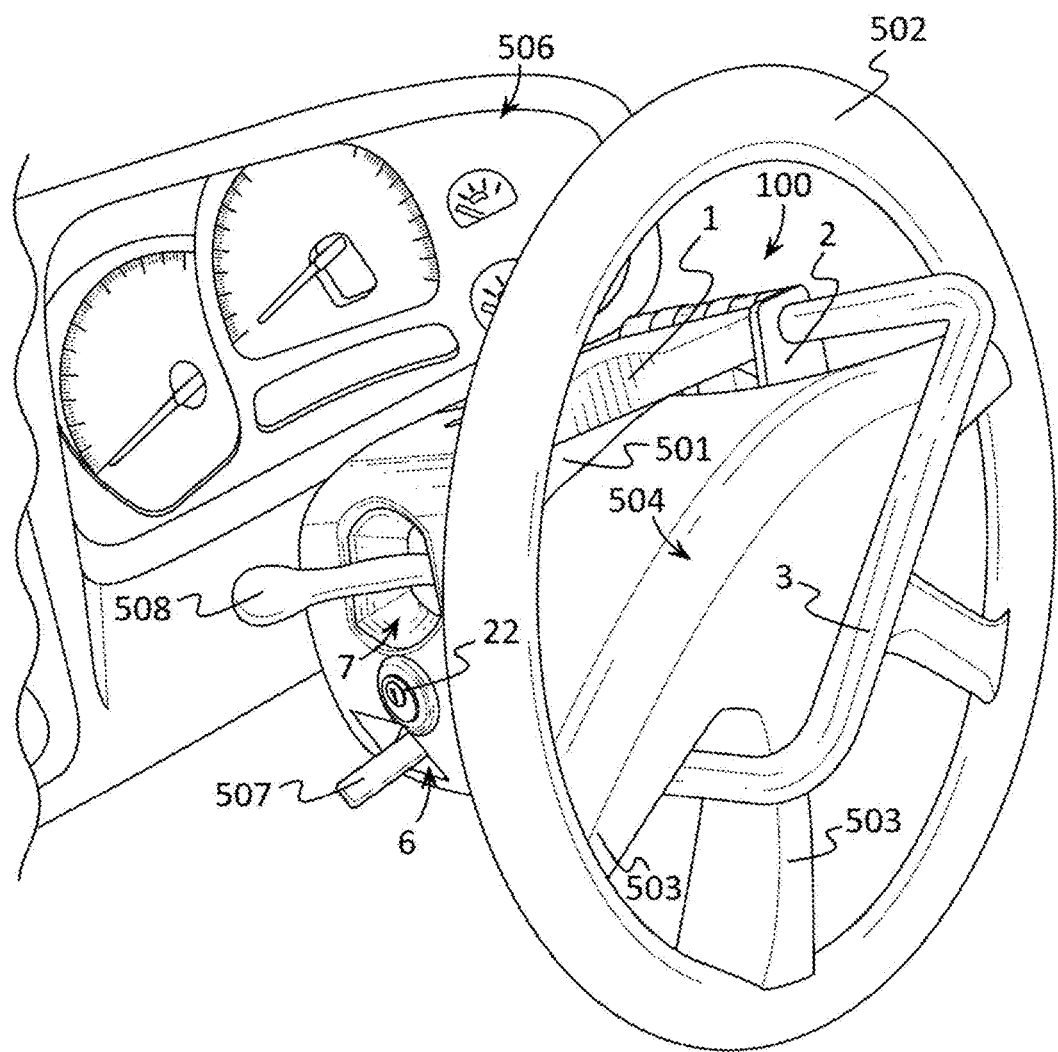
FIG. 1 depicts a first side perspective view of an example of a multi-lock vehicle theft prevention device secured to portions of a vehicle according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new vehicle theft prevention device and system are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. A vehicle theft prevention system 100 and device 101 are provided which completely prevents or at least, dramatically increases the time needed to try to break it, which will lead to thieves avoiding it, making a much more effective deterrent. FIGS. 1, 2, 6, and 10 illustrate examples of a multi-lock vehicle theft prevention device ("the device") 101 according to various embodiments. In some embodiments, the device 101 may comprise a major cover 1 and a minor cover 2 which may be coupled together to fit around and encircle the control housing (CH) 501, such as a steering column housing, of a vehicle and/or other element of a vehicle. The major cover 1 may have a first end 41, a second end 42, and a lock aperture 11. The minor cover may have a third end 43 and a fourth end 44. A hinge 8 may couple the first end 41 and third end together 43. A major ring 13, having a major aperture 23, may be coupled to the second end 42, and a minor ring 14, having a minor aperture 24, may be coupled to the fourth end 44. A lock bar 3 may have a crossbar 3A, a first leg 3B, and a second leg 3C, and the crossbar 3A may couple the first leg 3B and second leg 3C together. The first leg 3B may be configured to be removably received in the lock aperture 11, and the second leg 3C may be configured to be removably received in the major aperture 23 and minor aperture 34. The second leg 3C may couple the second end 42 to the fourth end 44 when the second leg 3C is received in the major aperture 23 and minor aperture 24, while the second end 42 and fourth end 44 may be separable when the second leg 3C is not received in the major aperture 23 and minor aperture 24. The first cover 1 and the second cover 2 may be configured to encircle portions, including all, of the CH 501 positioned between the first cover 1 and second cover 2 when the second end 42 is coupled to the fourth end 44. A lock 8 may be configured to govern the ability of the second leg 3C to be removed from the major aperture 23 and minor aperture 24.

Figure 2:
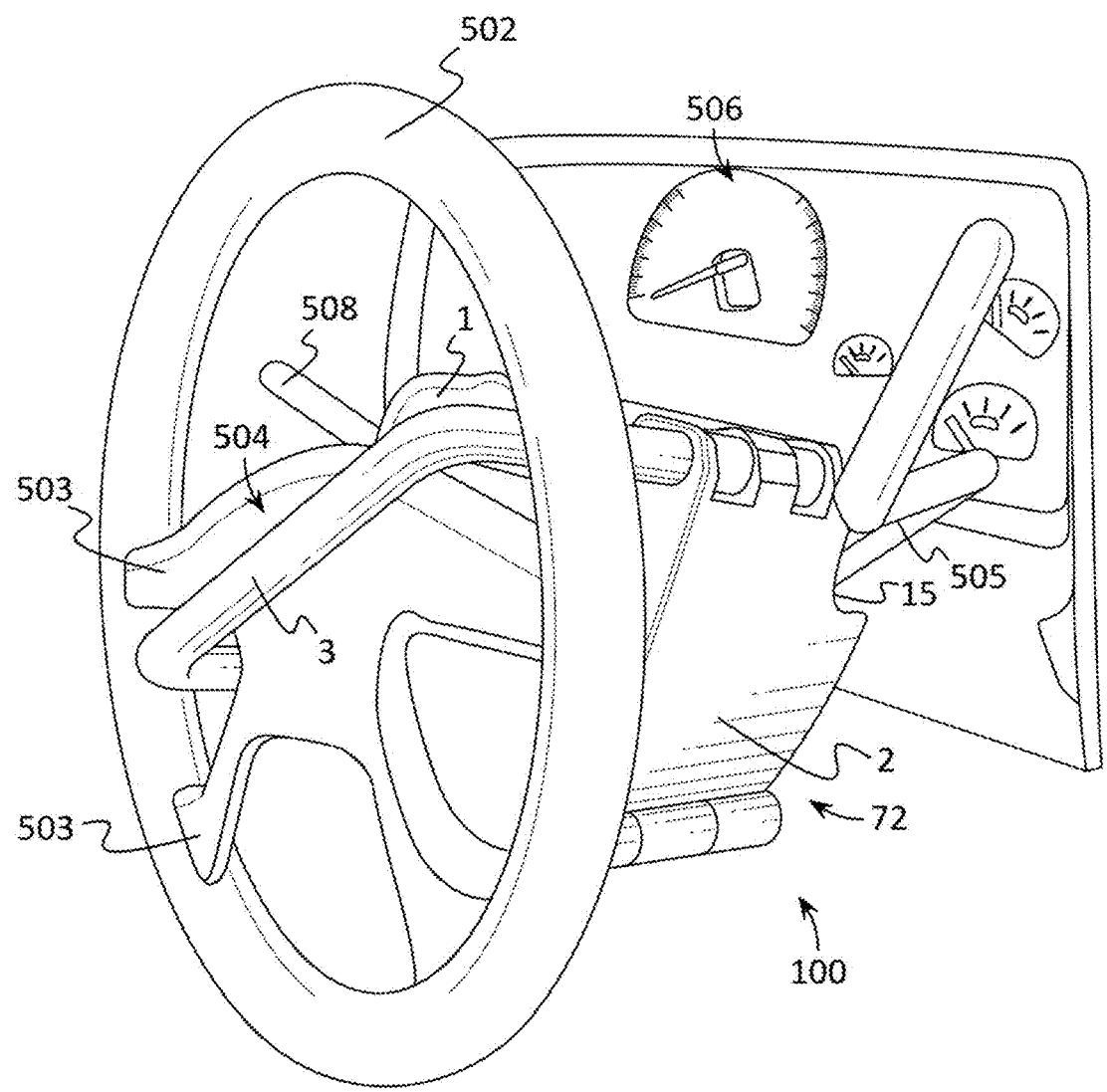
FIG. 2 illustrates a second side perspective view of an example of a multi-lock vehicle theft prevention device secured to portions of a vehicle according to various embodiments described herein.
Figure 3:
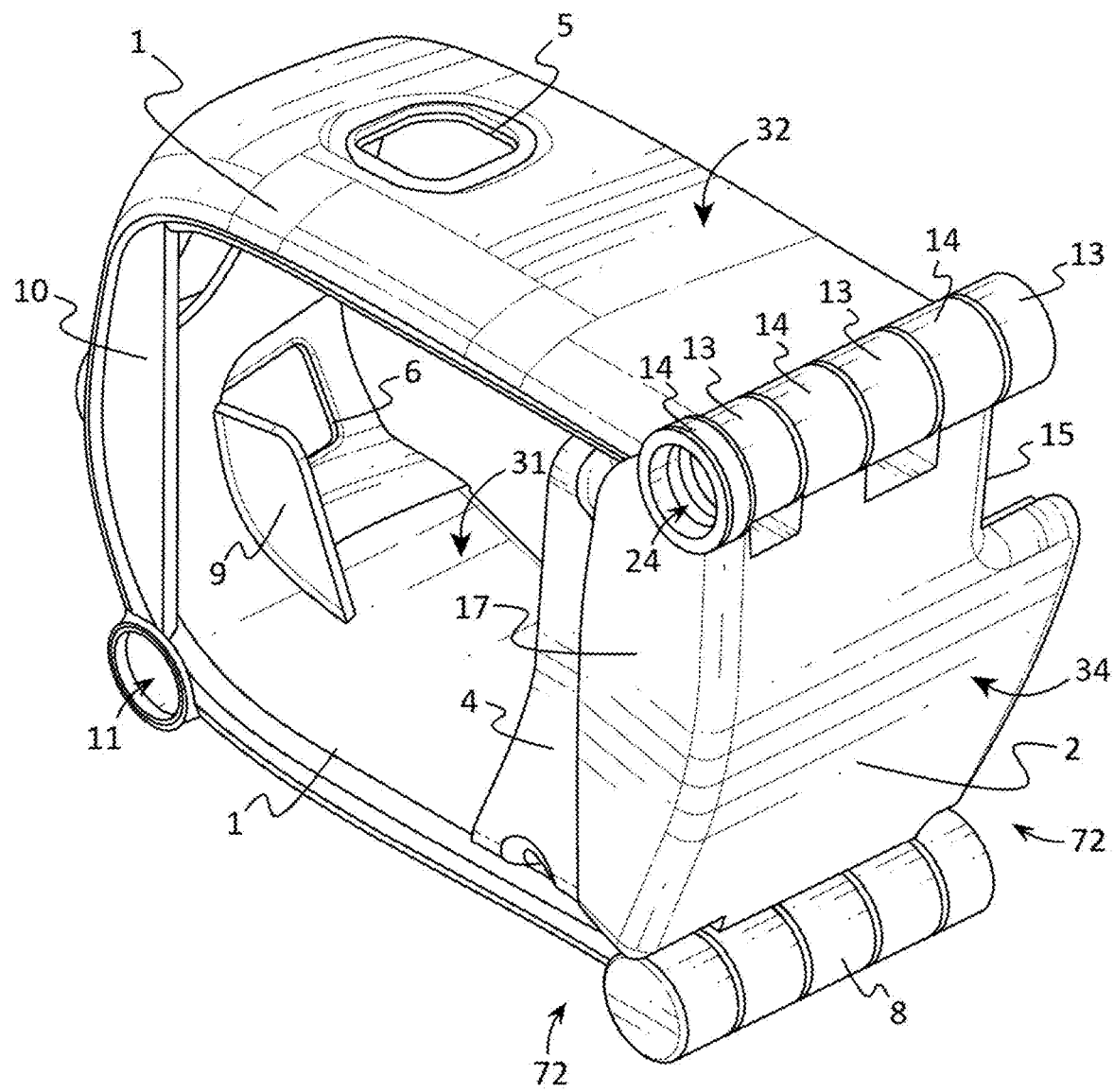
FIG. 3 shows a front perspective view of an example of a major cover, minor cover, and compartment bracket of a multi-lock vehicle theft prevention device according to various embodiments described herein.
Figure 4:
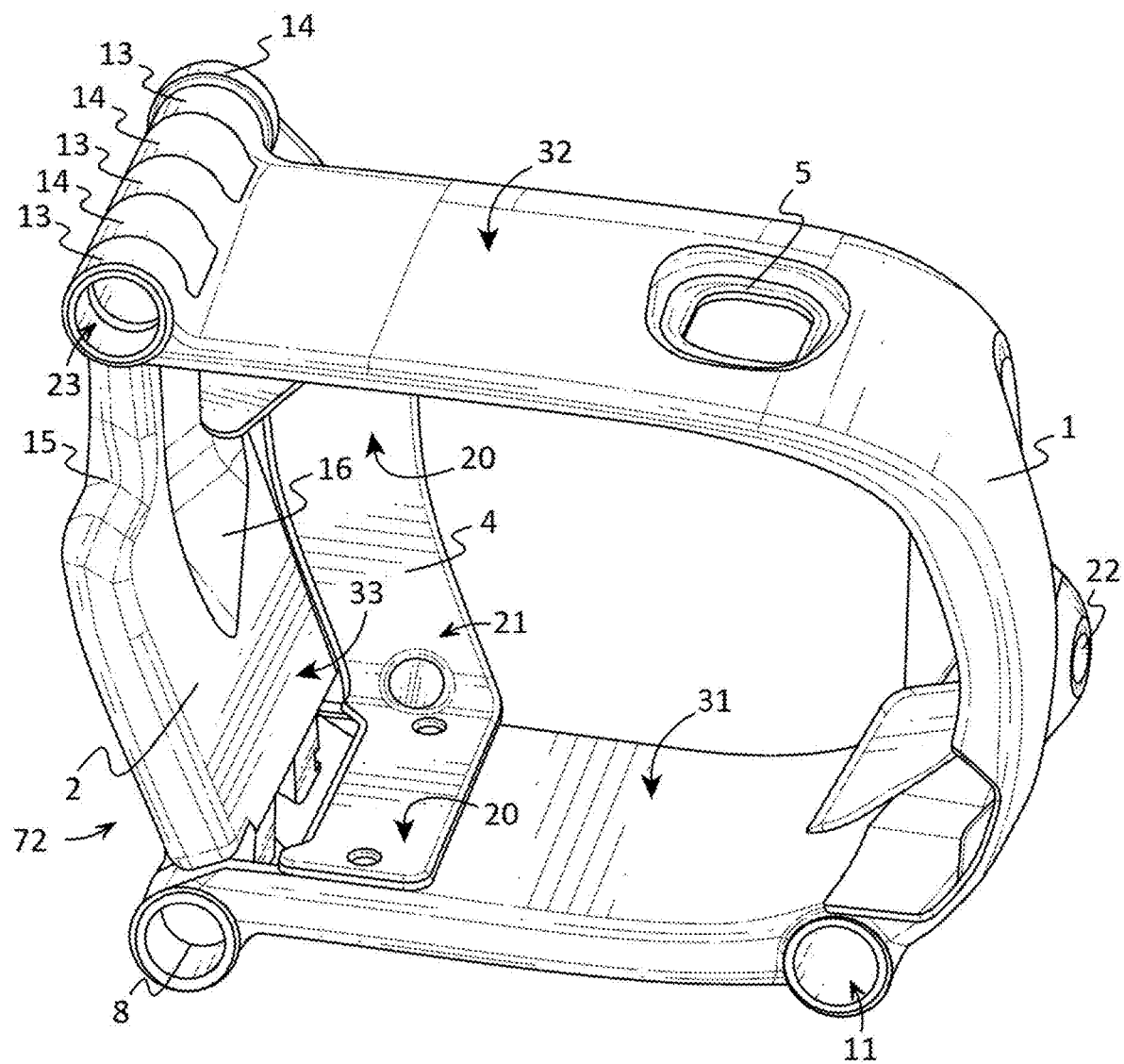
FIG. 4 depicts a rear perspective view of an example of a major cover, minor cover, and compartment bracket of a multi-lock vehicle theft prevention device according to various embodiments described herein.
Figure 5:
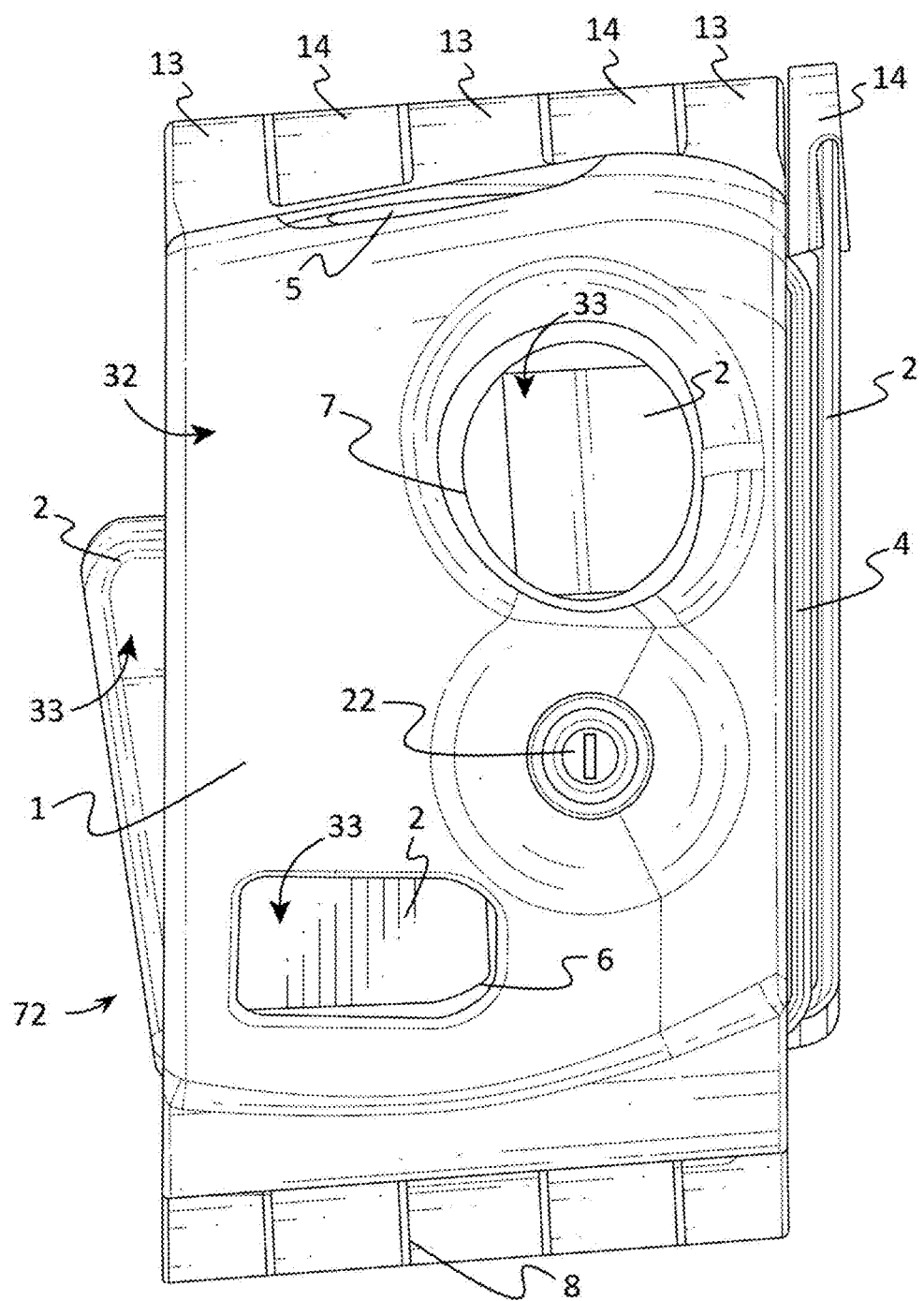
FIG. 5 illustrates a side elevation view of an example of a major cover, minor cover, and compartment bracket of a multi-lock vehicle theft prevention device according to various embodiments described herein.
Figure 6:
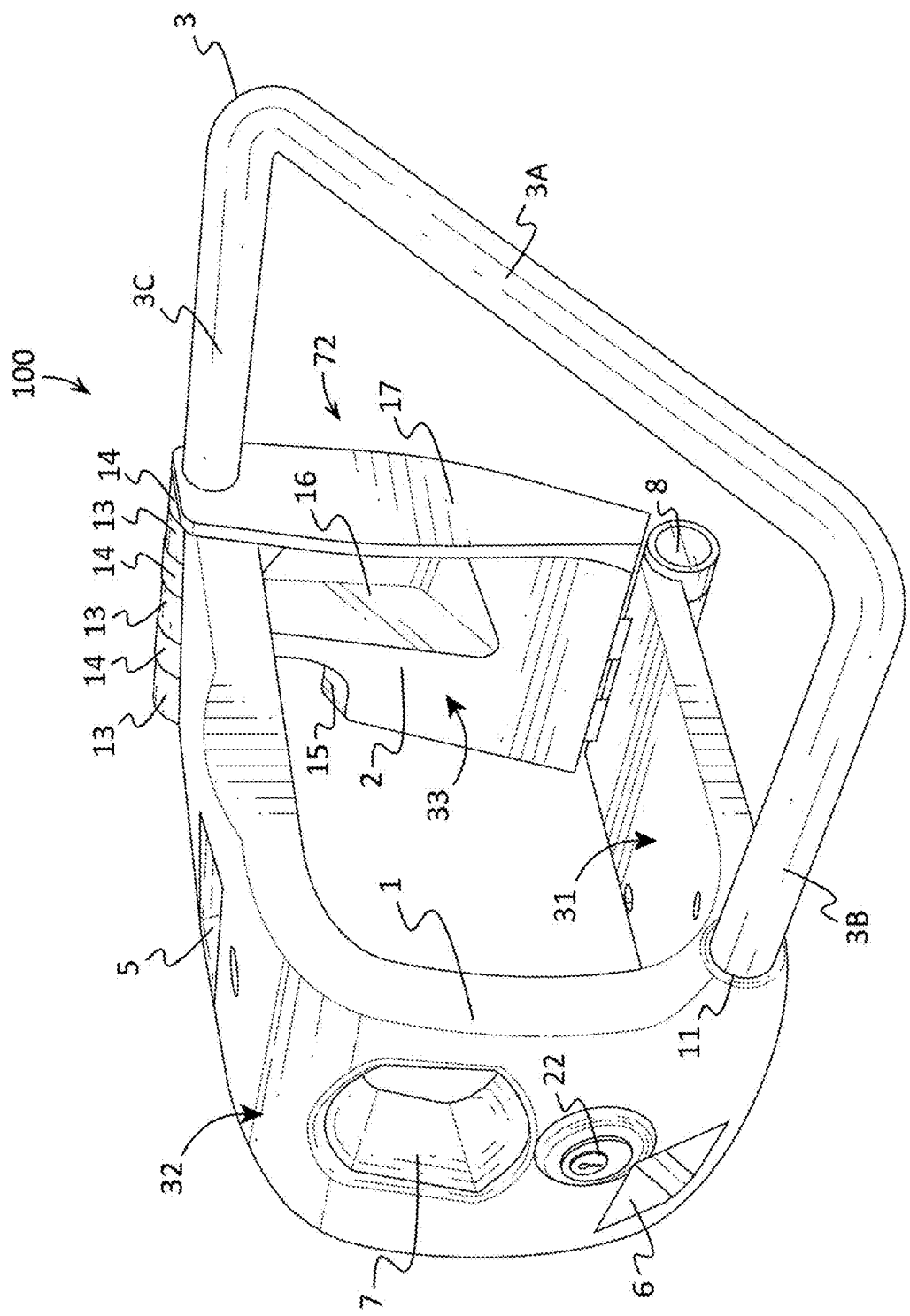
FIG. 6 shows a front perspective view of an example of a multi-lock vehicle theft prevention device in a closed position according to various embodiments described herein.

It should be understood that the device 101 is suitable for adapting the design to accommodate the differing geometry of any vehicle and is not limited to covering portions of vehicle CH's 501. The covers 1, 2, may be configured to cover any portion of a vehicle or other object. Similarly, a lock bar 3 is not limited to engaging round steering wheel type vehicle control inputs 502 as depicted in FIGS. 1 and 2, but may be configured to engage with any type of vehicle control input 502, such as hydraulic control levers and joysticks, handle bars, etc. In other words, the device 101 may be custom made to suit or fit portions of any vehicle. Optionally, a device 101 may fit a number of vehicle models. The device 101 may also be adapted to protect anything else, like bicycles, ATVs, jetskis, boats, snow machines, tractors, construction equipment, motorcycles, bicycles, snowmobiles, and other possessions so that the device 101 may comprise a different physical lock design.

The major cover 1 and minor cover 2 of the device 101 may be configured to fit around, and more preferably completely around, the control housing (501), such as a steering column housing, between the instrument panel 506 and the vehicle control input 502 of a vehicle. In some embodiments, the major cover 1 may be configured to cover left side portions of the CH 501 and the minor cover 2 may be configured to cover right side portions of the CH 501, such as in left side driver vehicles. In other embodiments, the major cover 1 may be configured to cover right side portions of the CH 501 and the minor cover 2 may be configured to cover left side portions of the CH 501, such as in right side driver vehicles.

In some embodiments, the major cover 1 may be the largest part of the device 101 structure. In preferred embodiments, the major cover 1 may be substantially U-shaped. In further embodiments, the major cover 1 may comprise a substantially U-shape profile so that it may cover portions of the top, bottom, and a side (such as the right side or left side) of the CH 501. The major cover 1 may comprise a major inner surface 31 and a major outer surface 32. The major inner surface 31 may be shaped or configured to be positioned proximate to and/or in contact with portions of the top, bottom, and a side of the CH 501. The major outer surface 32 may be opposingly positioned to the major inner surface 31 and may be shaped to be prominent, decorative (for those that want it to stand out) or esthetically pleasing by blending in with the interior and, not obstruct the drivers view of the instrument panel.

In some embodiments, a major cover 1 may comprise one or more major rings 13. In preferred embodiments, major rings 13 may be coupled to or proximate to the second end 42. Each major ring 13 may comprise a major aperture 23 which may be sized and shaped to allow portions of the second leg 3C to be inserted through the major aperture 23. For example, a major aperture 23 may comprise a generally hollow cylindrical shape and a second leg 3C may comprise a slightly smaller generally solid cylindrical shape so that the portions of the second leg 3C to be inserted through the major aperture 23.

Preferably, a major cover 1 may be made from or may comprise substantially rigid materials such as steel alloys, aluminum, aluminum alloys, copper alloys, other types of metal or metal alloys, various types of hard plastics, such as polyethylene (PE), Ultra-high-molecular-weight polyethylene (UHMWPE, UHMW), polypropylene (PP) and polyvinyl chloride (PVC), polycarbonate, nylon, Poly(methyl methacrylate) (PMMA) also known as acrylic, melamine, hard rubbers, fiberglass, carbon fiber, resins, such as epoxy resin, wood, other plant based materials, or any other material including combinations of materials that are substantially rigid In some embodiments, a minor cover 2 may be relatively smaller than a major cover 1. When the device 101 is configured to be used on left hand drive (LHD) vehicles, minor cover 2 may cover portions of the, and more preferably, completely covers, right side of the CH 501. However, a minor cover 2 may be configured in any size and shape.

In some embodiments, a minor cover 2 may comprise one or more minor rings 14. In preferred embodiments, minor rings 14 may be coupled to the minor cover 2 generally opposite a hinge 8 that is movably coupling the covers 1, 2, together. Each minor ring 14 may comprise a minor aperture 24 which may be sized and shaped to allow portions of the second leg 3C to be inserted through the minor aperture 24. For example, a minor aperture 24 may comprise a generally hollow triangular prism shape and a second leg 3C may comprise a slightly smaller generally solid triangular prism shape so that the portions of the second leg 3C to be inserted through the minor aperture 24.

Figure 7:
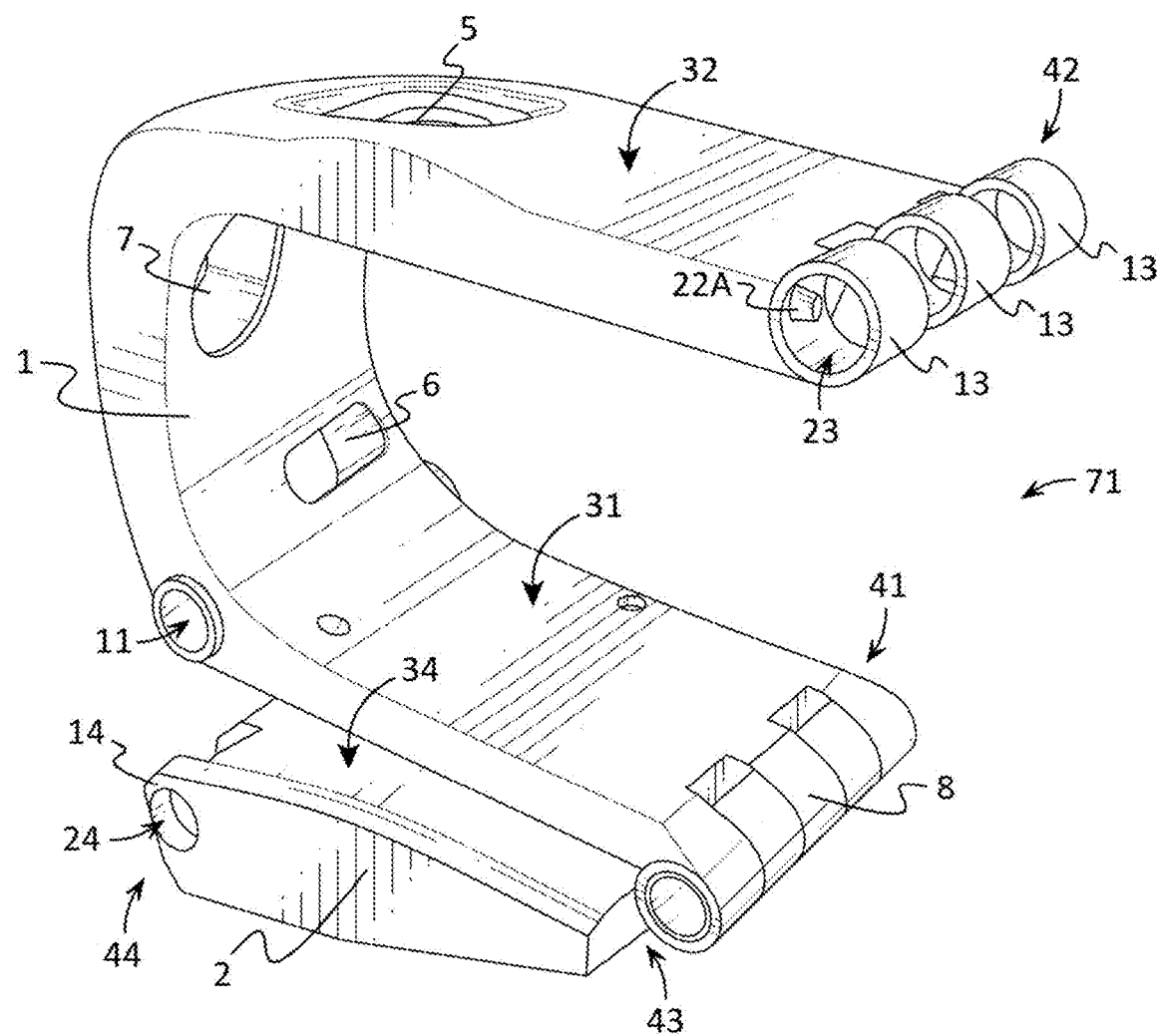
FIG. 7 depicts a perspective view of an example of a major cover and minor cover in an open position according to various embodiments described herein.
Figure 8:
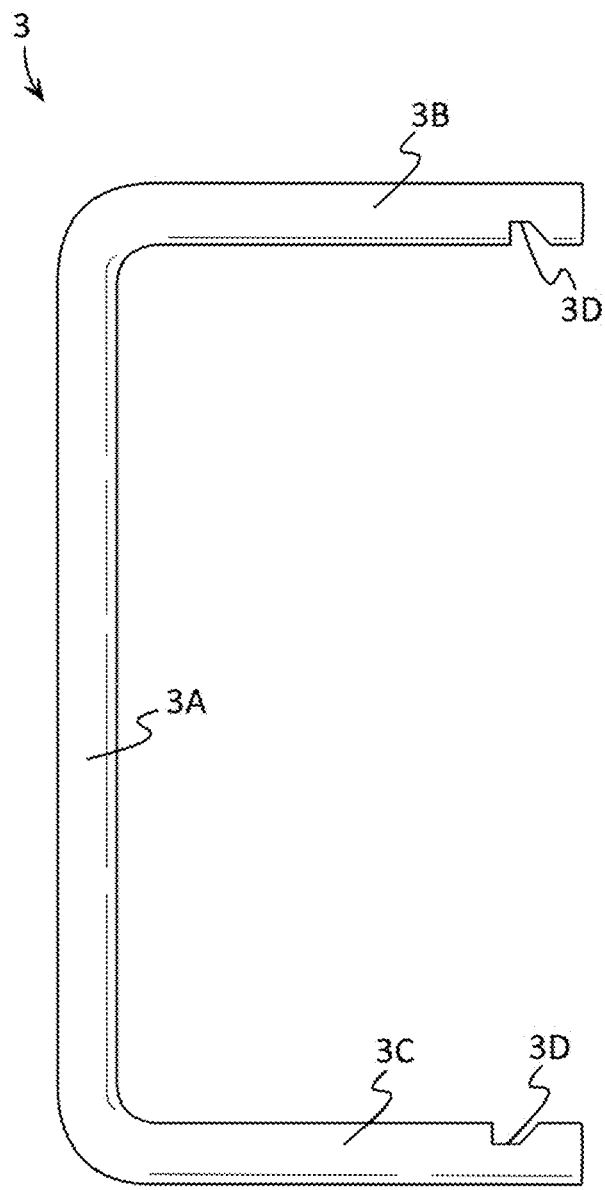
FIG. 8 illustrates a plan view of an example of a lock bar according to various embodiments described herein.

The minor cover 2 may be movably coupled to major cover 1 by a hinge 8 to facilitate easily installing the device 101 on any vehicle when the minor cover 2 is moved into an open position 71 (FIG. 7) and a closed position 72 (FIGS. 2-6). Generally, the minor cover 2 may be shaped to block access to an ignition switch on the CH 501 and to prevent the gear shift lever 505 of the vehicle from being moved when in the closed position 72, both crucial vehicle controls to starting the vehicle and driving it away. For these vehicles, minor cover 2 is easily moved between two positions—closed 72, when the vehicle is unoccupied and needs to be secured by locking the device and open 71 or unlocked to allow the owner unimpeded access to the steering wheel, ignition switch, and gear shift while driving.

One or more hinges 8 may be positioned anywhere on the device 101 to provide a pivotal joining engagement between the major cover 1 and the minor cover 2. A hinge 8 may comprise a butt hinge, butterfly hinge, flush hinge, barrel hinge, concealed hinge, continuous hinge, T-hinge, strap hinge, double-acting hinge, Soss hinge, a flexible material hinge, or any other type or style of hinge or pivotal joining method that allows portions of a major cover 1 and the minor cover 2 to be pivoted away from each other. In further embodiments, a hinge 8 may comprise any type of hinge known in the art, including so-called "living" hinges, which typically comprise a linear, relatively flexible area between two relatively more rigid components, such as a line of thin plastic between thicker plastic portions, as is well known in the art.

In preferred embodiments, minor cover 2 may pivot counter-clockwise around the hinge 8 from the horizontal, open position 71, approximately ¾ of a circle to the vertical, closed position 71 where the one or more minor rings 14 align with the one or more major rings 13 of the major cover 1. In further embodiments, the one or more minor rings 14 of minor cover 2 meshes or interlinks with the one or more major rings 13 of the major cover 1 so that the major aperture(s) 23 and minor aperture(s) 24 align to allow the second leg 3C to be received or inserted into the aligned major aperture(s) 23 and minor aperture(s) 24. The major aperture(s) 23 and minor aperture(s) 24 may be configured in any shape and size to receive a second leg 3C of any shape and size.

The minor cover 2 may comprise a minor inner surface 33 and a minor outer surface 34. The minor inner surface 33 may be shaped or configured to be positioned proximate to and/or in contact with portions of a side of the CH 501, such as the right side or left side. The minor outer surface 34 may be opposingly positioned to the minor inner surface 33 and may be shaped to be prominent, decorative (for those that want it to stand out) or esthetically pleasing by blending in with the interior and, not obstruct the drivers view of the instrument panel. The inner surface 31 of major cover 1 and inner surface 33 of minor cover 2 may be shaped to fit tightly around the control housing (CH) 501. In preferred embodiments, the outside surfaces 32, 34, may be formed into an attractive shape that complements the vehicle interior, thus facilitating the owner leaving the covers 1, 2, installed on the CH 501 so that the device 101 can be used in the quickest and easiest way. This greatly increases the likelihood of locking it each time the vehicle is parked to prevent it from being stolen. This is very important, because with current products some owners won't lock when leaving for a short time and when a vehicle is targeted and followed, the thief only needs a couple minutes to steal it.

In some embodiments, the device 101 may comprise a gear shift depression 15 which may be formed or cut along the edge of minor cover 2, or anywhere else on a cover 1, 2, depending on the vehicle application, to obstruct motion of the gear shift lever 505 by an individual when the minor cover 2 is in the closed position 72 around the CH 501. In further embodiments, the device 101 may comprise an ignition recess 16 which may be formed on the minor inner surface 33, or anywhere else on a cover 1, 2, depending on the vehicle application, to fit around the ignition switch of the vehicle, thereby safeguarding it when the minor cover 2 is in the closed position 72 around the CH 501. For vehicles with the ignition switch and gear shift lever 505 not located on the CH 501, the device 101 will function the same way, except minor cover 2 will not need to be rotated between the vertical closed position 72 and horizontal open position 71—it may stay in closed position 72 at all times, except when the owner wishes to remove the device 101 or access the documents inside. For these vehicles, the device 101 may remain in the closed position 72, even while the user is operating the vehicle, while allowing the device 101 to protect the CH 501 at all times. The sense of explanations above is opposite for right hand drive (RHD) vehicles.

In preferred embodiments, the device 101 may include the combination of:
- forming the major inner surface 31 of major cover 1 and minor inner surface 33 of minor cover 2, including compartment bracket 4, tightly or snuggly to the shape of the CH 501;
- relatively close fit of the major inner surface 31 of major cover 1 and minor inner surface 33 of minor cover 2 front and rear surfaces to the vehicle control input 502 and instrument panel 506;
- a gripping material, such as latex rubber, silicone rubber, forms of the organic compound isoprene, such as polyisoprene, Butyl rubber, Polyacrylate Rubber, Ethylene-acrylate Rubber, Polyester Urethane, forming the inner surface 31 of major cover 1 and/or inner surface 33 of minor cover 2; and
- insertion of lock bar 3 through the vehicle control input 502 and locked to the covers 1, 2, via lock 22, makes the whole assembly very solidly held on the CH 501 with little movement possible. This physical sizing, very high resistance of the components to cutting, grinding, bending or any other way to break or get around it and close proximity of the horn is even more restrictive for the thief, because the noise would quickly lead to getting caught.

In some embodiments, the major cover 1 and minor cover 2 may be custom formed to snuggly fit around the CH 501 of a particular vehicle (or group of vehicles with substantially the same CH 501) by forming the inner surfaces 31, 33, to fit closely to the CH 501 so that when in the closed position 72, the inner surfaces 31, 33, grip the CH 501 tightly, so there is little or no movement.

In some embodiments, the major cover 1 and minor cover 2 may be configured to fit a larger range of vehicle CHs' 501 (one size fits many), by making it to fit the largest CH 501 in the range and using adaptor or filler pieces to fill the space left between smaller CH's 501 and inner surfaces 31, 33. When installed properly the inner surfaces 31, 33, and adaptor or filler pieces will grip the vehicle CH 501 as these adaptor or filler pieces can be formed using steel tube or sheet metal, molded plastic or any other suitable material and be secured to major cover 1 and/or minor cover 2 by a means that is inaccessible from the outside of the device 101 when it is locked in the closed position 72. This arrangement will fit the CH 501 as well as the first option immediately above.

In some embodiments, the space between smaller CH's 501 and the inner surface 31 of major cover 1 inner surface 33 of minor cover 2 may be filled by a fillable air or liquid bladder or bag that is accessible from the inside the device 101 when the device 101 is in the open position 71 and inaccessible from the outside when the device 101 is in the closed position 72. If a thief tries to break the device 101 by making a hole in the bladder, it may allow more movement of the device 101 relative to the CH 501, but the other physical locks and electronic protective elements will still work as designed and thus the lock will maintain its effectiveness and not be broken or disabled. This arrangement will fit the CH 501 as well as the first option above.

In some embodiments, the space between smaller CH's 501 and the inner surface 31 of major cover 1 and inner surface 33 of minor cover 2 may be filled by several types of foam with the right balance of firmness and flexibility to perform the functions required. This arrangement will fit the CH 501 as well as the first option above.

In some embodiments, the space between smaller CH's 501 and the inner surface 31 of major cover 1 and inner surface 33 of minor cover 2 can be spanned by wedges or other shaped material. They may be drawn together or apart to fill a smaller or larger space and may attach to inner pads or surfaces 31, 33, that contact the CH 501 and clamp inwardly to grip on it. This arrangement will fit the CH 501 as well as the first option above.

In some embodiments, the space between smaller CH's 501 and major cover 1 and minor cover 2 may be spanned by mechanical spacers adjustable by threads or other mechanical elements like a scissor jack style of linkage that, may attach to inner pads that contact the CH 501, so that when adjusted will fill a small to larger range of space. This arrangement may clamp inwardly to grip on and fit the CH 501 as well as the first option above.

The above alternate embodiments may: reduce the number of different size and shaped covers 1, 2, that need to be made to fit all vehicles; be easier for users like vehicle rental, dealerships, manufacturers and transporters to lock a large variety of vehicles; facilitate having a device 101 that would fit many new vehicles immediately or very quickly; and make it more economically viable to provide a system 100 and/or device 101 for low volume, which are often high value vehicles that are understandably common theft targets.

The device 101 may comprise a lock bar 3 which may be configured to fit across the central portions 504 of the vehicle control input 502 opposite to the CH 501 and through the vehicle control input 502 between one or more arms 503 of the vehicle control input 502 to engage with the covers 1, 2. In some embodiments, the lock bar 3 may comprise a crossbar 3A, a first leg 3B, and a second leg 3C, and the crossbar 3A may couple the first leg 3B and second leg 3C together. In further embodiments, a lock bar 3 may comprise one or more cam locks 3D, or other depressions, lock pins, or other protrusions, and/or any other engagement method, which may be configured to be engaged by the lock 22. In preferred embodiments, the lock bar 3 may be approximately U-shaped so that the first leg 3B and second leg 3C may be approximately parallel to each other. Optionally, a crossbar 3A and/or leg 3B. 3C, may comprise a tubular shape. In other embodiments, a lock bar 3 may be configured in any other shape and size to allow one or more portions of the lock bar 3 to engage with the major cover 1 and/or minor cover 2 and to prevent or hinder rotation of the vehicle control input 502 while engaged to the major cover 1 and/or minor cover 2. A lock bar 3 may be made from or may comprise substantially rigid materials which may be resistant to cutting and tampering, such as steel alloys, and other suitable metals and metal alloys.

In preferred embodiments, the first leg 3B may be configured to be removably received in the lock aperture 11, and the second leg 3C may be configured to be removably received in the one or more major apertures 23 and minor apertures 24. While inserted in the one or more major apertures 23 and minor apertures 24, the second leg 3C may couple the second end 42 to the fourth end 44. The second end 42 and fourth end 44 may then be separable when the second leg 3C is not received in the major aperture and minor aperture. In further preferred embodiments, a lock bar 3 may be configured to engage with a vehicle control input 502 of the vehicle so that the first leg 3B and second leg 3C extend through the vehicle control input 502 to block between 0.1 and 360 degrees, and more preferably between 5 and 270 degrees, of rotation of the vehicle control input 502 when the first leg 3B is received in the lock aperture 11 and the second leg 3C is received in the major aperture(s) 23 and minor aperture(s) 24.

The device 101 may comprise one or more locks 22 which may be configured to govern the ability of one or both of the legs 3B, 3C, to be removed from the lock aperture 11 and/or major aperture(s) 23 and minor aperture(s) 24, respectively. A lock 22 may include locking elements like cams, pins, collars or other mechanical elements to interlock with lock bar 3 when the second leg 3C is inserted into the one or more major apertures 23 of the major cover 1 and the one or more minor apertures 24 of the minor cover 2. For example, a lock 22 may include one or more lock protrusions 22A which may be moved into and out of contact or engagement with one or more cam locks 3D on one or more legs 3B, 3C, in an aperture 11, 23, 24, in order to prevent or enable the legs 3B, 3C, to be removed from the lock aperture 11 and/or major aperture(s) 23 and minor aperture(s) 24, respectively. A lock 22 may be located anywhere on the device 101, such as between major cover 1, minor cover 2, and lock bar 3. A lock 22 may include a mechanical, electric, or wireless linkage which may be operable to govern the ability of the second leg 3C to be removed from the major aperture(s) 23 and minor aperture(s) 24. One lock 22 may be enough to secure the lock bar 3, but using two or more locks 22 in a variety of locations makes the device 101 more secure by multiplying the required points that a thief needs to try to disable, thus making it tougher to break.

The lock 22 may be one of several types. For example, a lock 22 may comprise an excellent security, mechanical keyed lock, but it also may be of other types existing in the security industry, including electric or wireless connectivity, possibly via the security app 421 by one of the possible connecting technologies, including examples like Bluetooth, near-field or cellular with encryption as needed. Preferably, attempts to break the main device 101 with a hammer, drill or Ramset gun will be resisted by placing strengthening elements around the lock 22 in the device 101 and when a mechanical linkage is used, such breaking efforts will shear off the links to the locking elements that recoil inside major cover 1 so they can't be pulled or removed.

In some embodiments, to lock the device 101, the two legs 3B, 3C, of lock bar 3 may be pushed forward by the driver through the vehicle control input arm(s) 503 of the vehicle control input 502 near central portions 504 of the vehicle control input opposite to the CH 501 and insert the second leg 3C to be removed from the major aperture(s) 23 and minor aperture(s) 24 to automatically engage the locking mechanism of the lock 22, preferably, immediately prevent the removal of lock bar 3. This may lock major cover 1, minor cover 2, and lock bar 3 together in seconds to secure the vehicle. The crossbar 3A of lock bar 3 preferably spans the central portions 504 of the vehicle control input opposite to the CH 501 (middle of the vehicle control input 502 typically where the horn and/or air bag is located, to add further difficulty for the thief. Spanning the central portions 504 of the vehicle control input 502 makes cutting the vehicle control input 502 to get around the device 101 much more difficult than vehicle control input locks that hold on the perimeter. This position makes prying lock bar 3 sideways over the vehicle control input arms 503 virtually impossible. On all vehicles the device 101 may be unlocked by withdrawing lock bar 3 toward the driver. For vehicles where the device 101 also locks the ignition switch and gear shift lever, withdrawing lock bar 3 releases the upper end of the right-side part minor cover 2 so it can rotate clockwise to the stowage position under the major cover 1 (FIG. 7) and therefore under the a CH 501 that the major cover 1 is resting on to enable driving. For vehicles with gear shift lever 505 and ignition switch off the CH 501, use of lock bar 3 would be the same to lock and unlock the vehicle control input 502 and minor cover 2 may remain in the vertical position closed position 72 while vehicle is operated by authorized user.

In preferred embodiments, three novel physical locking points secured by the device 101 (vehicle control input 502, gear shift, lever 505, and ignition switch explained above) combine to make it extremely difficult for a thief to overcome and drive the vehicle away quickly. For vehicles where the ignition switch and/or the gear shift lever 505 are not on the steering column, the scope of protection seems to be less, but even where only the vehicle control input 502 is locked, the strength, toughness and stability of the device 101 still prevents the vehicle from being driven away while the device 101 is secured around the CH 501 and vehicle control input 502.

In some embodiments, the device 101 may comprise a compartment bracket 4. A compartment bracket 4 may be coupled to the major cover 1 and/or minor cover 2, and the compartment bracket 4 may extend between the first end 41 and second end 42 and/or between the third end 43 and fourth end 44. The compartment bracket 4 may comprise a bracket inner surface 20 which may face the inner surfaces 31, 33, when the compartment bracket 4 is coupled to the major cover 1 and/or minor cover 2. Preferably, a compartment bracket 4 may be used when the device 101 will be left installed on the CH 501. It is optional to use, but it solidifies the device 101 on the CH 501, better prevents potential tampering by a thief and can only be accessed when the device 101 is unlocked and moved into the open position 71. In some embodiments, compartment bracket 4 may attach to the top and bottom of the inner surface 31 of major cover 1 proximate to the first end 41 and second end 42 in such a way that the device 101 must be open to access it.

In some embodiments, the device 101 may be configured to form a storage space 21 between the CH 501 and the covers 1, 2, and compartment bracket 4. Generally, a bracket inner surface 20 and portions of the minor inner surface 33 and optionally major inner surface 31 along with portions of the CH 501 proximate to the covers 1, 2, and compartment bracket 4 may form or bound the storage space 21. The storage space 21 may only be accessible when the device is unlocked and moved into the open position 71. It may be configured in any size and shape, for example to contain a garage door opener, some other small device, as well as, keep ownership and insurance documents that contain their personal and address information in a safe place at all the times. These are almost always kept in the vehicle, as required by law to show when pulled over. In other embodiments, a storage space 21 may be formed anywhere else between the CH 501 and the covers 1, 2, and compartment bracket 4. A storage space 21 prevents a thief getting them, or the information on them, which they could use to steal additionally from the owner at any later time—identity theft, fraud or home burglary.

secure document storage space for a garage door opener, ownership and insurance documents with their personal and address information, inside the device 101 (between the device 101 and CH 501) is only accessible when it is and moved into the open position 71, preventing a thief from stealing further from the owner.

In preferred embodiments, the covers 1, 2, lock bar 3, optional compartment bracket 4, and any other element described herein may be made from metal and metal alloy which may be metallurgically hardened, making it a better lock since it is much tougher to break and more difficult to circumvent. In further embodiments, one or more components may be made of hardened steel to increase the difficulty of cutting it and the noise generated by trying to do so. In some embodiments, surfaces 31, 32, 33, 34, join at the front and rear edges to make a series of tubular or tube-like cross sections that vary along each of their lengths which completely encircles the CH 501 in, most preferably double walled hardened steel. In some embodiments, one or more components may be made from a tube by tube hydroforming, assembled from several formed sheet metal parts by welding or several other fabrication methods. In preferred embodiments, the covers 1, 2, may comprise double walled hardened steel collar encircling the CH 501 which prevents a thief from connecting wires to actuate the starter without the ignition key (hot wiring).

In further embodiments, major cover 1, minor cover 2 and the adaptors or wedges can be made using a variety of techniques. Molding, casting, stamping, welding and sheet or tube hydroforming are other fabricating options. Tube hydroforming offers a preferable balance of variety of shapes, continuous metal without joints or welds and economical manufacturing. However, the other manufacturing methods may be used. A ductile metal may be used including aluminum, magnesium, titanium, Inconel, steel or stainless steel, but the difficulty of forming the shapes required is higher. The most preferred option would be steel, because of its formability, economy, strength, toughness and heat treatability, which can make it very hard, but not brittle, impervious to attempts to break it. In further embodiments, the device 101 may include one or more deterrents to impede a thief if they try to cut, grind or other methods to break it. These deterrents may include: material flammable when grinding or cutting; separate elements that shift, move, spin or act to shatter cutting or grinding discs; live electrical wires; and/or other devices or material that are only a hazard to someone or something cutting into the device 101.

In some embodiments, the device 101 may comprise a flasher aperture 5. Generally, a flasher aperture 5 may comprise an aperture of any size and shape which may extend through a major cover 1 and/or minor cover 2 which may be positioned over an emergency flasher switch on a CH 501 while the device 101 is resting on the CH 501. The flasher aperture 5 may enable a user to toggle the emergency flasher switch on a CH 501 while the device 101 is resting on the CH 501 in the closed 72 and/or open 71 position.

In some embodiments, the device 101 may comprise a tilt steering aperture 6. Generally, a tilt steering aperture 6 may comprise an aperture of any size and shape which may extend through a major cover 1 and/or minor cover 2 which may be positioned to enable portions of a tilt steering lever 507 (and/or a cruise control lever) on a CH 501 to extend through the tilt steering aperture 6 while the device 101 is resting on the CH 501. The tilt steering aperture 6 may enable a user to operate the tilt steering lever 507 (and/or a cruise control lever) on a CH 501 while the device 101 is resting on the CH 501 in the closed 72 and/or open 71 position.

In some embodiments, the device 101 may comprise a signal light aperture 7. Generally, a signal light aperture 7 may comprise an aperture of any size and shape which may extend through a major cover 1 and/or minor cover 2 which may be positioned to enable portions of a signal light lever 508 on a CH 501 to extend through the signal light aperture 7 while the device 101 is resting on the CH 501. The signal light aperture 7 may enable a user to operate the signal light lever 508 on a CH 501 while the device 101 is resting on the CH 501 in the closed 72 and/or open 71 position.

In some embodiments, the device 101 may comprise a gear shift depression 15. Generally, a gear shift depression 15 may comprise a depression or cutout in the minor cover 2 which may be positioned to enable portions of a gear shift lever 505 on a CH 501 to extend through the gear shift depression 15 while the device 101 is resting on the CH 501. Preferably, the gear shift depression 15 may enable a user to operate the gear shift lever 505 on a CH 501 while the device 101 is resting on the CH 501 in the closed 72 position.

A flasher aperture 5, tilt steering aperture 6, signal light aperture 7, and/or gear shift depression 15 may enable a user to access controls on the CH 501 so that while driving, the device 101 can be left in place on the CH 501 with free access to all operational controls of the vehicle by stowing or holding minor cover 2 underneath major cover 1. Leaving the device 101 on the CH 501 at all times is strongly preferable for several reasons which may include: compact design and appearance that blends in with the vehicle interior; placement in front of the driver is a subtle visual reminder to lockup each time the vehicle is left unattended; it keeps the vehicle securely locked during a winter 'warm up' period, until the driver unlocks before driving away; much easier and less effort for the owner to lock and unlock; time to lock and unlock is very short (10 seconds); and these facilitate and encourage more frequent use. These reasons that encourage more frequent use are very important because a large proportion of thefts are when keys are left in the vehicle or unlocked.

It's common for drivers to not bother locking when they won't be gone very long. If a thief has targeted a vehicle, they can be following and act very quickly. Ten minutes can be more than enough time. This combination of factors, if it means the driver locks the device 101 every time, dramatically increases theft prevention effectiveness, because a lock only protects when it's locked and the more often the better. Alternatively, the device 101 can be relatively easily removed from the CH 501 each time the vehicle is driven, if the owner prefers.

In some embodiments, the device 101 may include one or more plates, stampings or other mechanical elements to major cover 1 and/or minor cover 2 to improve fit and stability of the device 101 on the CH 501 or to block a thief's attempts to tamper with the device 101, particularly the one size fits many designs. Examples are distal plate 9, central plate 10, and minor plate 17 on FIG. 3. These plates, stampings or other mechanical elements may be positioned on or coupled to any element of the device 101. For example, central plate 10 may extend between the top and bottom major inner surface 31 of major cover 1, proximate to the vehicle control input 502 location.

Figure 9:
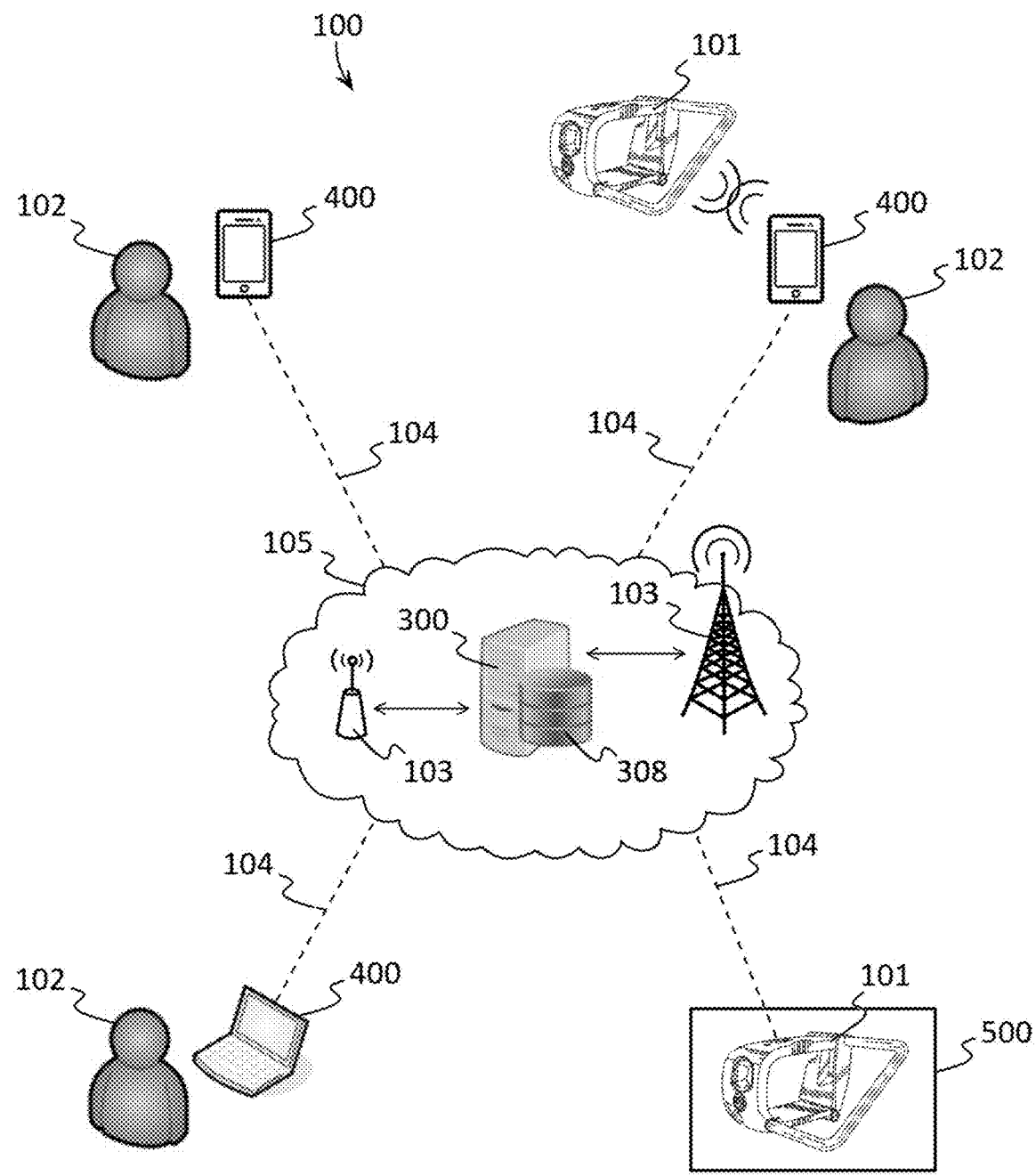
FIG. 9 shows some components of an example of a multi-lock vehicle theft prevention system according to various embodiments described herein.

Turning now to FIG. 9 an example of a multi-lock vehicle theft prevention system ("the system") 100 is depicted according to various embodiments described herein. The system 100 is configured to facilitate the transfer of data and information between one or more devices 101, electronic devices 400, and servers 300 over a data network 105. Each electronic device 400 and device 101 may send data to and receive data from the data network 105 through a network connection 104 with an access point 103. A data store 308 accessible by the server 300 may contain one or more databases. The data may comprise any information describing one or more users 102 of the system 100, information describing one or more vehicles 500 of a user 102, information describing devices 101 of the system, information recorded or generated by devices 101, and any other information which may be used to prevent or address vehicle 500 theft.

In this example, the system 100 comprises at least one electronic device 400 (but preferably more than two electronic devices 400) configured to be operated by one or more users 102. Electronic devices 400 can be mobile devices, such as laptops, tablet computers, personal digital assistants, smart phones, and the like, that are equipped with a wireless network interface capable of sending data to one or more servers 300 with access to one or more data stores 308 over a network 105 such as a wireless local area network (WLAN). Additionally, electronic devices 400 can be fixed devices, such as desktops, workstations, and the like, that are equipped with a wireless or wired network interface capable of sending data to one or more servers 300 with access to one or more data stores 308 over a wireless or wired local area network 105. The system 100 may be implemented via at least one device 101 and a electronic device 400 and/or server 300 programmed to perform one or more of the steps described herein. In some embodiments, more than one electronic device 400 and/or server 300 may be used, with each being programmed to carry out one or more steps of a method or process described herein.

The system 100 may be configured to prevent a variety of types of vehicle 500 theft via one or more devices 101. Its overall purpose is to provide protection for the possessions of the owner for all types of vehicle, contents and additional theft (subsequent identity, fraud, house or other). Generally, the system 100 may comprise a device 101 that fits around the CH 501 of a vehicle 500, preferably between the vehicle control input 502 and the instrument panel 506, which is a very strong physical lock on as many as three of the vehicle 500 control systems. The device 101 may be in communication with one or more electronic devices 400 of users 102, such as the owner/operator of the vehicle 500, law enforcement personnel, security personnel, etc. Preferably, the system 100 includes connectivity between a device 101 in a vehicle 500 and the owner's electronic device 400, such as a smartphone via a security app 421 or web portal. The system 100 may enable immediate connection to entities, such as police services, monitoring services, etc., to react to a potential theft incident of a vehicle 500 having a device 101, such as if the owner 102 is unable, undesiring, or unavailable for response.

Figure 10:
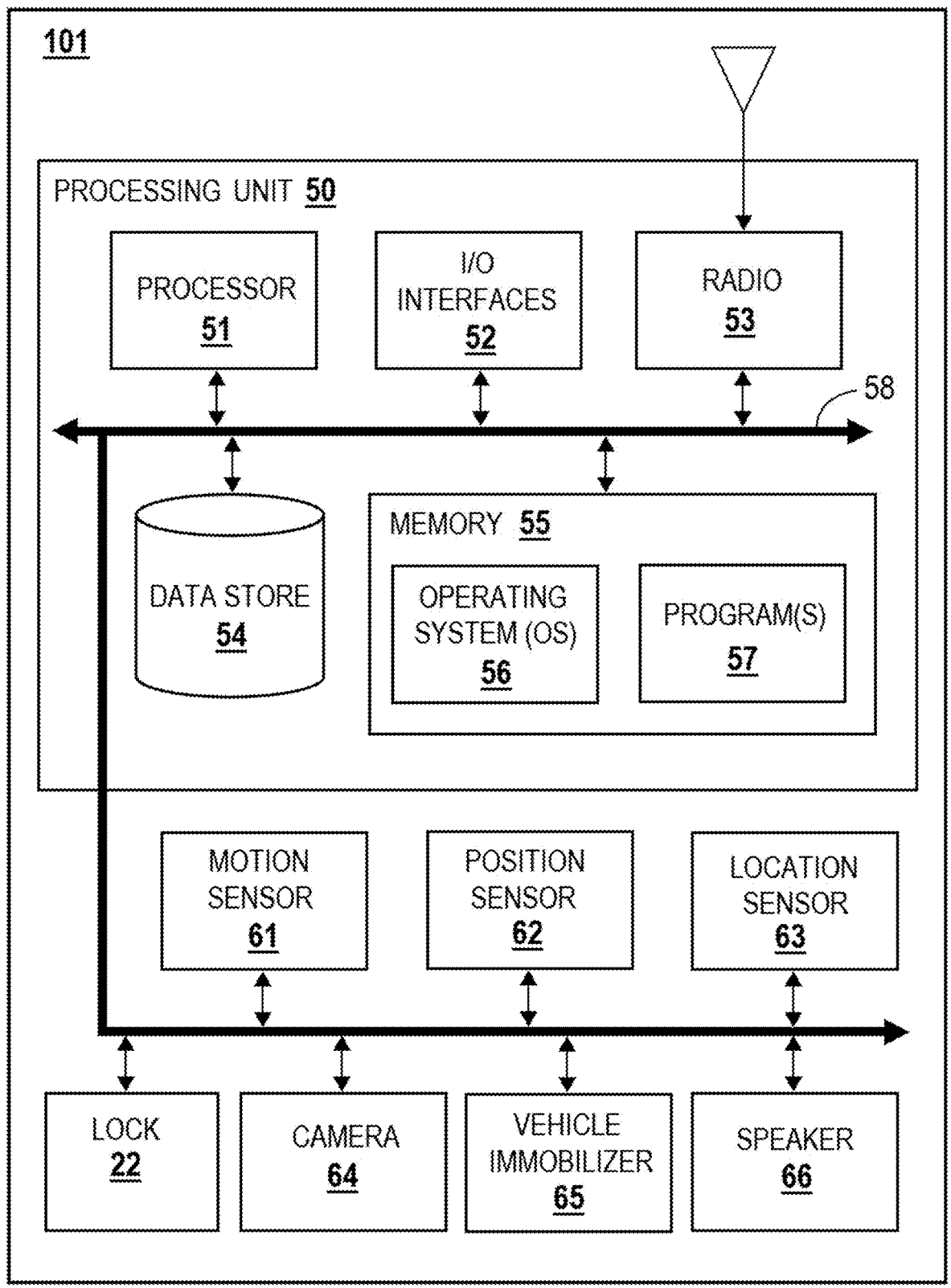
FIG. 10 depicts a block diagram of some of the components of a multi-lock vehicle theft prevention device of a multi-lock vehicle theft prevention system according to various embodiments described herein.

In some embodiments, the system 100 may comprise a processing unit 50 which may be integrated with a device 101 or may be physically separated from the device 101 while being in electronic communication with one or more elements of the device 101. FIG. 10 shows a block diagram of an example of a processing unit 50 of a device 101 according to various embodiments described herein. In some embodiments and in the present example, the device 101 can be a digital device that, in terms of hardware architecture, comprises a processing unit 50 which generally includes a processor 51, input/output (I/O) interfaces 52, an optional radio 53, a data store 54, and memory 55. It should be appreciated by those of ordinary skill in the art that FIG. 10 depicts the processing unit 50 in an oversimplified manner, and a practical embodiment may include additional components or elements and suitably configured processing logic to support known or conventional operating features that are not described in detail herein.

The components of a processing unit 50 and elements (22, 61, 62, 63, 64, 65, 66) may be communicatively coupled via a local interface 58. The local interface 58 can be, for example but not limited to, one or more buses or other wired or wireless connections, integrated circuits, etc., as is known in the art. The local interface 58 can have additional elements, which are omitted for simplicity, such as controllers, buffers (caches), drivers, repeaters, and receivers, among many others, to enable communications. Further, the local interface 58 may include address, control, and/or data connections to enable appropriate communications among the aforementioned components.

The processor 51 is a hardware device for executing software instructions. The processor 51 can be any custom made or commercially available processor, a central processing unit (CPU), an auxiliary processor among several processors associated with the processing unit 50, a semiconductor-based microprocessor (in the form of a microchip or chip set), or generally any device for executing software instructions. When the processing unit 50 is in operation, the processor 51 is configured to execute software stored within the memory 55, to communicate data to and from the memory 55, and to generally control operations of the device 101 pursuant to the software instructions. In an exemplary embodiment, the processor 51 may include a mobile optimized processor such as optimized for power consumption and mobile applications.

The I/O interfaces 52 can be used to input and/or output information and power. In some embodiments, I/O interfaces 52 may include one or more turnable control knobs, depressible button type switches, a key pad, slide type switches, dip switches, rocker type switches, rotary dial switches, numeric input switches or any other suitable input which a user may interact with to provide input. In further embodiments, I/O interfaces 52 may include one or more light emitting elements or other display device, e.g., a LED (light emitting diodes), a speaker, or any other suitable device for outputting or displaying information. The I/O interfaces 52 can also include, for example, a serial port, a parallel port, a small computer system interface (SCSI), an infrared (IR) interface, a radio frequency (RF) interface, a universal serial bus (USB) interface, and the like.

A radio 53 enables wireless communication to an external access device or network. In preferred embodiments, a radio 53 may operate via WiFi and Bluetooth communication standards. In further embodiments, a radio 53 may operate on a cellular band and may communicate with or receive a Subscriber Identity Module (SIM) card or other wireless network identifier. Any number of suitable wireless data communication protocols, techniques, or methodologies can be supported by the radio 53, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

Generally, the radio 53 may be used to communicate information from the device 101 to one or more electronic devices 400. This may enable the system 100 to provide a notification to a user 102 from the electronic device 400 in which the notification comprises data received by the electronic device 400 from the processing unit 50 of the device 101.

The data store 54 may be used to store data. The data store 54 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 54 may incorporate electronic, magnetic, optical, and/or other types of storage media.

The memory 55 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 55 may incorporate electronic, magnetic, optical, and/or other types of storage media. Note that the memory 55 may have a distributed architecture, where various components are situated remotely from one another, but can be accessed by the processor 51. The software in memory 55 can include one or more software programs, each of which includes an ordered listing of executable instructions for implementing logical functions.

In the example of FIG. 10, the software in the memory system 55 includes a suitable operating system (O/S) 56 and programs 57. The operating system 56 essentially controls the execution of input/output interface 52 functions, and provides scheduling, input-output control, file and data management, memory management, and communication control and related services. The operating system 56 may be, for example, LINUX (or another UNIX variant), Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), Raspbian (available from the Raspberry Pi Foundation) and the like. The programs 57 may include various applications, add-ons, etc. configured to provide end user functionality with the device 101. For example, exemplary programs 57 may include, but not limited to, environmental variable analytics and modulation of input/output interface 52 functions. In a typical example, the end user typically uses one or more of the programs 57 to control functions of the device 101 and to control and enable data to be exchanged with a desired electronic device 400 that the device 101 may be configured to communicate with.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The processing unit 50 may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by the processor 51. In addition, the main memory may be used for storing temporary variables or other intermediate information during the execution of instructions by the processor 51. The processing unit 50 may further include a read only memory (ROM) or other static storage device (e.g., programmable ROM (PROM), erasable PROM (EPROM), and electrically erasable PROM (EEPROM)) coupled to the bus for storing static information and instructions for the processor 51.

In some embodiments, the device 101 may comprise an electronic type of lock 22 which may be in communication with the processing unit 50, and the lock 22 may be operable via user 102 input provided to the electronic device 400 of the user 102. In this manner, the user 102 may control the lock 22 and thereby govern the ability of the second leg 3C to be removed from the major aperture(s) 23 and minor aperture(s) 24 of the device 101. An electronic type of lock 22 works by means of an electric current and is usually connected to an access control system (processing unit 50). In addition to the pin and tumbler used in standard locks, electronic locks connect the bolt or cylinder to a motor within the device 101 using a part called an actuator to motivate the physical components of the lock. In further embodiments, a lock 22 may be a smart lock which is an electromechanics lock that gets instructions to lock and unlock the second leg 3C from an authorized device using a cryptographic key and wireless protocol.

In some embodiments, the system 100 may comprise a motion sensor 61 which may be configured to detect motion or movement of one or more components of a device 101 and/or motion or movement of one or more components of a vehicle 500. The motion sensor 61 may communicate data describing this movement to the processing unit 50, and processing unit 50 may provide data to an electronic device 400 describing the motion, such as by providing an audio and/or visual notification via an I/O interface 404 of the electronic device 400. An audio notification may comprise one or more sounds output by a speaker type of I/O interface 404, and a visual notification may comprise data displayed on a display screen 404A of the device 400.

A motion or proximity sensor 61 in the device 101 may be configured to detect when something is happening or moving in the vehicle 500 when there shouldn't be. Other motion 61 or proximity sensors may be placed elsewhere in the vehicle 500 to trigger the alerts/alarms or other elements in the system 100. Example locations are in the doors, including the rear door, the hood or tailgate of the vehicle 500 to give an earlier warning of unwanted activity in the vehicle to the owner, including stealing contents. This includes any other form of unwanted entry like stealing the vehicle by towing it away with this system 100 still locked and intact.

A motion sensor 61 may comprise a passive infrared motion sensor, microwave motion sensor, ultrasonic motion sensor, tomographic motion sensor, video camera software, or any other type of sensor configured to detect motion of one or more objects.

In some embodiments, the system 100 may comprise a position sensor 62 which may be configured to detect changes in the position of one or more components of a device 101 and/or changes in the position of one or more components of a vehicle 500. The position sensor 62 may communicate data describing these changes in the position to the processing unit 50, and processing unit 50 may provide data to an electronic device 400 describing these changes in the position, such as by providing an audio and/or visual notification via an I/O interface 404 of the electronic device 400. An audio notification may comprise one or more sounds output by a speaker type of I/O interface 404, and a visual notification may comprise data displayed on a display screen 404A of the device 400.

A position sensor 62 may comprise a moment switch, detent switch, single pole switch, electric eye, Hall effect sensor, pressure switch, electrical circuit, a reed switch, a contact sensor, a button mount, an ambient light sensor, Capacitive transducer, Capacitive displacement sensor, Eddy-current sensor, Ultrasonic sensor, Grating sensor, Inductive non-contact position sensors, Laser Doppler Vibrometer (optical), Linear variable differential transformer (LVDT), Multi-axis displacement transducer, Photodiode array, Piezo-electric transducer (piezo-electric), Potentiometer, Proximity sensor (optical), Rotary encoder (angular), Seismic displacement pick-up, String potentiometer (also known as string pot, string encoder, cable position transducer), or any other suitable sensor for detecting changes in the position of one or more components of a device 101 and/or changes in the position of one or more components of a vehicle 500.

In some embodiments, the system 100 may comprise a location sensor 63 configured to detect the location of the device 101. In preferred embodiments, a processing unit 50 may be in communication with a location sensor 63, and the processing unit 50 may be configured to provide data describing the location of the device 101 to the electronic device 400. Data from the location sensor 63 may be provided to the electronic device 400 periodically, continuously, upon the processing unit 50 receiving a request from the electronic device 400, and/or in any other manner. In some embodiments, a location sensor 63 may be configured to act or aid the system 100 to find the vehicle 500 if it is stolen anyway, for example when no one reacts to the other barriers, the vehicle 500 is towed or the device 101 isn't locked.

In preferred embodiments, a location sensor 63 may be configured to receive a global positioning system (GPS) signal and calculate coordinate data for a device 101 and to communicate the data to a processing unit 50. In preferred embodiments, a location sensor 63 may comprise GPS logger sensor which may log the position of the device 101 at regular intervals in a memory. In other embodiments, a location sensor 63 may comprise a GPS data pusher sensor configured to push or send the position of the device 101 as well as other information like speed or altitude at regular intervals. In further embodiments, a location sensor 63 may comprise a GPS data puller sensor or GPS transponder sensor which may be queried for GPS data as often as required. In still further embodiments, a location sensor 63 may comprise any other suitable device or sensor that is able to measure and electrically communicate location data, such as GPS data.

In some embodiments, the system 100 may comprise a camera 64. A camera 64 may be configured to record image data, such as still images or video images of the environment around a device 101 and/or in or around a vehicle 500. In preferred embodiments, a camera 64 may comprise a digital camera that encodes images and videos digitally on a charge-coupled device (CCD) image sensor or on a complementary metal-oxide-semiconductor (CMOS) image sensor and stores them for later reproduction. In other embodiments, a camera 64 may comprise any type of camera which includes an optical system, typically using a lens with a variable diaphragm to focus light onto an image pickup device or image sensor. In preferred embodiments, the processing unit 50 of a device 101 may be configured to provide image data recorded by a camera 64 to the electronic device 400. In some embodiments, a camera 64 may take a photo and/or video to identify the thief and see in the vehicle 500 when locked. This may be triggered by the motion sensor 61 in the device 101 or the security app 421. Camera 64 may be designed for low light or include a light to illuminate the thief or 'flash' their eyes.

In some embodiments, the system 100 may comprise a vehicle immobilizer 65, wherein the vehicle immobilizer 65 which may be operable by the processing unit 50 of a device 101. An vehicle immobilizer 65, sometimes referred to as an immobiliser or immobilizer, is an electronic security device fitted to a vehicle 500 that prevents the engine or motor from running unless the correct transponder car key (or other token) is present. This prevents the car from being "hot wired" after entry has been achieved and thus reduces motor vehicle theft. In preferred embodiments, a vehicle immobilizer 65 may comprise any engine immobilizing and/or shutdown device which may be activated automatically by locking the system 100 or by the owner or driver in an emergency.

In some embodiments, the system 100 may comprise a speaker 66, and the speaker may be operable by the processing unit 50. A speaker 66 may be used to produce a plurality of sounds at a plurality of volume levels. Preferably, a speaker 66 may be configured to produce sounds which may be used to audibly appraise a user 102 of the status of one or more elements of a device 101 and/or vehicle 500 that the device 101 is in. For example, if a motion sensor 61 detects motion of a component of the device 101 indicating that the device 101 is being tampered with, the processing unit 50 may cause the speaker to emit a siren or other warning sound. In some embodiments, a speaker 66 may play an installed or pre-recorded message(s) or allow the owner to shout at the thief to scare them off. A speaker 66 may comprise a buzzer, a piezoelectric sound producing device, a dielectric elastomer sound producing device, a buzzer, a moving coil loudspeaker, an electrostatic loudspeaker, an isodynamic loudspeaker, a piezo-electric loudspeaker, or any other device capable of producing one or more sounds. Optionally, a speaker 66 may comprise a horn of a vehicle 500 that a device 101 is located in.

In some embodiments, the system 100 may comprise a security application or "app" 421 which may comprise a smartphone, tablet computer, or other electronic device application. In preferred embodiments, a security app 421 may be configured to run on an electronic device 400. In other embodiments, a security app 421 may be configured to run on an electronic device 400 and/or a server 300. A security app 421 may provide notifications to a user 102, such as alerts, a silent alarm, panic button and other controls, police alert, and a monitoring service.

In some embodiments, a security app 421 may be configured to communicate with a device 101 to activate or deactivate a light on the unit, connect with other elements of the security system and/or to show status of the device 101—locked or unlocked. The owner can see it's locked and makes double checking that it is locked easier. A record may be kept in the security app 421 to verify locking timing and frequency for security system, police or insurance purposes. This may also couple with other complementary systems, like, for example, vehicle tracking to correlate locking with driving and stopping, showing when the lock 22 is used (when more than one person drives it), ideally every time it is stopped for some time.

In some embodiments, a security app 421 may be configured to activate a silent alarm on an app installed on the owner's cell phone or other electronic device 400 to give the owner immediate warning. It can also include escalating warnings depending on the location of the sensor. Hood or tailgate open first, that may be followed by tampering with the main device 101, or if all sensors are going off at the same time, likely the vehicle is being towed.

In some embodiments, a security app 421 may be configured to activate an audible alarm via a speaker 66 to scare the thief away and give anyone nearby an immediate warning. Optionally, it can be connected to power somewhere else in the vehicle 500 without any wired connection to the main device 101 to prevent a thief from disabling it. The sound emitted may be distinctive, for example a dog barking and snarling, to address the widespread apathy people have developed for 'normal' alarm sounds.

In some embodiments, a security app 421 may be configured to automatically alert police or do so with owner verification to minimize false alarms.

In some embodiments, a security app 421 may be configured to work with a monitoring service offered with the device 101 so the owner isn't disturbed during the night or may be away from the vehicle 500 for a long time.

In some embodiments, a security app 421 may enable a door lockdown that could be actuated by the owner user 102 or automatically triggered by an element of the system 100 to prevent the doors from being opened from the inside, trapping the thief in the vehicle 500.

In some embodiments, a security app 421 may include elements to ensure all components are present and if one isn't, an alert and/or alarm will be triggered and the vehicle 500 may be locked out from starting. This may be accomplished with RFID devices or tags, motion sensors, as well as other types and accompanying communication technologies. One reason for this is a thief attempting to prevent communication between components within the vehicle 500, with the security app 421 or in any other way by, for example, covering the main device 101 or other components with a blocking or shielding material. This novel part of the system 100 adds further complexity for the thief and makes apprehension more likely.

In further embodiments, this technique may also be used to protect vehicle contents, which includes parts of the vehicle 500 that can be easily stolen, like wheels, removeable seats, accessories, under-hood parts, as well as other items like laptops, tablets, bicycles, etc. While it is best practice to avoid keeping valuables in a vehicle 500, sometimes it is necessary or convenient. Some versions of the system 100 may include additional devices or tags that can be temporarily placed on desired vehicle contents to be monitored as the system components above are. This novel aspect of the system 100 adds complexity for the thief by making it risky to steal vehicle contents, which has been safe for them to do once they've broken into the vehicle.

In some embodiments, a security app 421 may give the owner user 102 control to use some options or not, interact with the vehicle 500, monitor in-vehicle activity, alerts/alarm, shout at thief, immediate or automatic call for help, carjacking defense elements.

Carjacking is a threat, for which no current theft prevention device provides any protection, that is potentially much worse than theft of the vehicle, because additionally danger for the owner and occupants is very high. To help face and deal with this problem, in some embodiments, a security app 421 may include a panic button or a panic button may otherwise be integrated with a device 101 to call local police, system monitoring and others, an engine immobilizer 65, GPS locator or position sensor 62, as well as other features of the system 11 listed above will mitigate carjacking risk and consequences. The thief may stop upon recognizing this system and knowing they won't get far.

Figure 11:
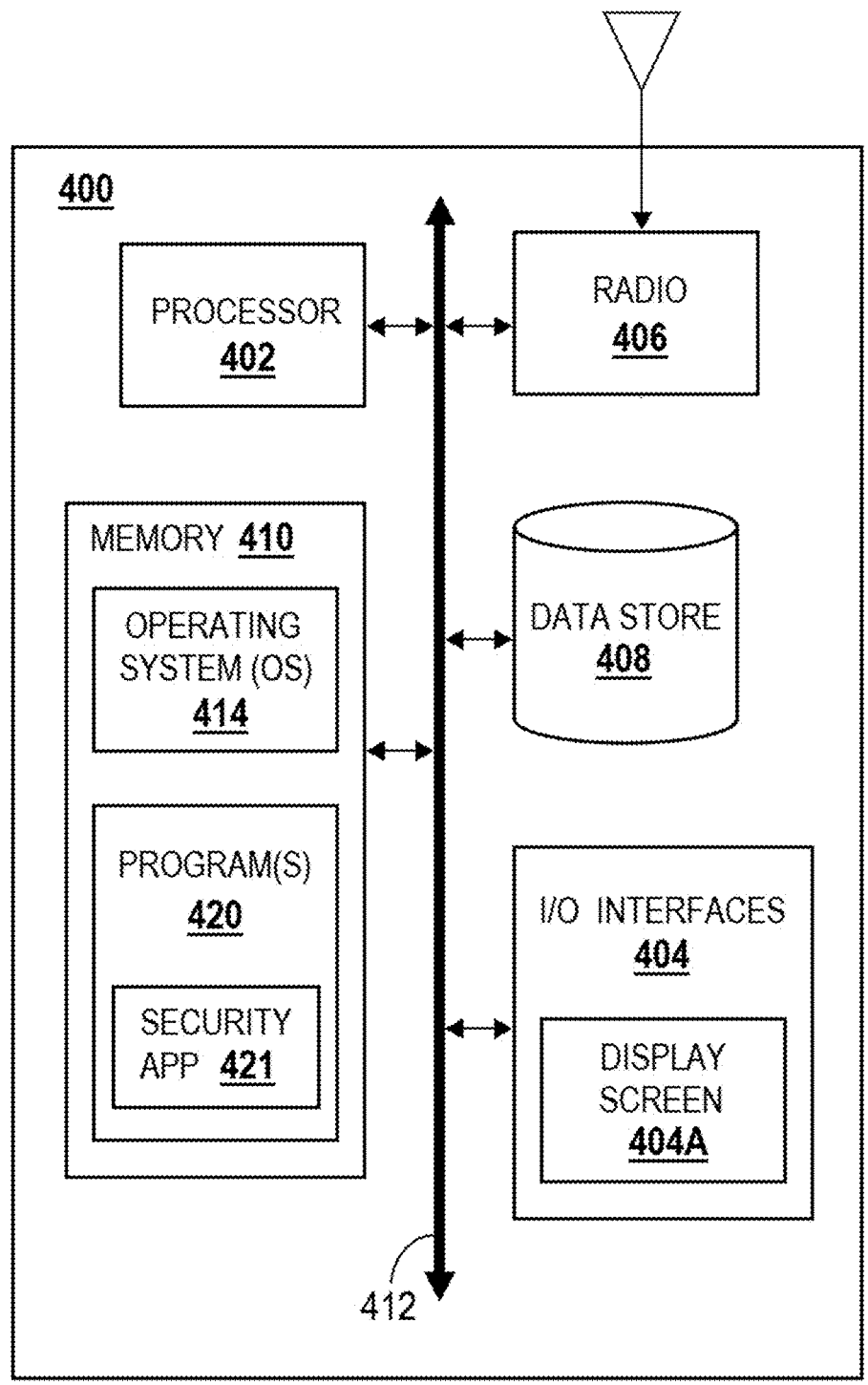
FIG. 11 illustrates a block diagram of some of the components of an electronic device which may be used in a multi-lock vehicle theft prevention system according to various embodiments described herein.

Referring to FIG. 11, in an exemplary embodiment, a block diagram illustrates an electronic device 400 of which one or more may be used in the system 100 or the like and which may be a type of computing platform. The electronic device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 11 depicts the electronic device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the electronic device 400, a semiconductor-based microprocessor (in the form of a microchip or chip set), or generally any device for executing software instructions. When the electronic device 400 is in operation, the processor 402 is configured to execute software stored within the memory 410, to communicate data to and from the memory 410, and to generally control operations of the electronic device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display screen 404A such as a liquid crystal display (LCD), touch screen, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the electronic device 400. Additionally, the I/O interfaces 404 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 408 may be used to store data and is therefore a type of memory. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs 420, each of which includes an ordered listing of executable instructions for implementing logical functions. In the example of FIG. 11, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like.

The programs 420 may include a security app 421 and various applications, add-ons, etc. configured to provide end user functionality with the electronic device 400. For example, exemplary programs 420 may include, but not limited to, a web browser, social networking applications, streaming media applications, games, mapping and location applications, electronic mail applications, financial applications, and the like. In a typical example, the end user typically uses one or more of the programs 420 along with a network 105 to manipulate information of the system 100.

While some exemplary shapes and sizes have been provided for elements of the device 100, it should be understood to one of ordinary skill in the art that the major cover 1, minor cover 2, lock bar 3, optional compartment bracket 4, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 101 may be made from or may comprise durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the device 101 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 101 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the device 101 may be coupled by being one of connected to and integrally formed with another element of the device 101.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A multi-lock vehicle theft prevention device for use with a vehicle, the device comprising:
   a. a major cover having a first end, a second end, and a lock aperture;
   b. a minor cover having a third end and a fourth end;
   c. a hinge coupling the first end and third end together;
   d. a major ring, having a major aperture, coupled to the second end;
   e. a minor ring, having a minor aperture, coupled to the fourth end;
   f. a lock bar having a crossbar, a first leg, and a second leg, the crossbar coupling the first leg and second leg together, wherein the first leg is configured to be removably received in the lock aperture, wherein the second leg is configured to be removably received in the major aperture and minor aperture, wherein the second leg couples the second end to the fourth end when the second leg is received in the major aperture and minor aperture, the major cover and the minor cover configured to encircle a control housing positioned between the major cover and minor cover when the second end is coupled to the fourth end, and wherein the second end and fourth end are separable when the second leg is not received in the major aperture and minor aperture; and
   g. a lock, wherein the lock is configured to govern the ability of the second leg to be removed from the major aperture and minor aperture.

2. The device of claim 1, wherein the lock bar is configured to engage with a vehicle control input of the vehicle so that the first leg and second leg extend through the vehicle control input to block between approximately 0.1 and 360 degrees of rotation of the vehicle control input when the first leg is received in the lock aperture and the second leg is received in the major aperture and minor aperture.

3. The device of claim 1, wherein the minor cover is movable between an open position and a closed position.

4. The device of claim 1, wherein the lock bar is U-shaped.

5. The device of claim 1, wherein the major cover is U-shaped.

6. The device of claim 1, further comprising a flasher aperture.

7. The device of claim 1, further comprising a tilt steering aperture.

8. The device of claim 1, further comprising a signal light aperture.

9. The device of claim 1, further comprising a gear shift depression.

10. A multi-lock vehicle theft prevention system, the system comprising:
    a. An electronic device in communication with a wireless network;
    b. a multi-lock vehicle theft prevention device for use with a vehicle, the device comprising:
       i. a major cover having a first end, a second end, and a lock aperture;
       ii. a minor cover having a third end and a fourth end;
       iii. a hinge coupling the first end and third end together;
       iv. a major ring, having a major aperture, coupled to the second end;
       v. a minor ring, having a minor aperture, coupled to the fourth end;
       vi. a lock bar having a crossbar, a first leg, and a second leg, the crossbar coupling the first leg and second leg together, wherein the first leg is configured to be removably received in the lock aperture, wherein the second leg is configured to be removably received in the major aperture and minor aperture, wherein the second leg couples the second end to the fourth end when the second leg is received in the major aperture and minor aperture, the major cover and the minor cover configured to encircle a control housing positioned between the major cover and minor cover when the second end is coupled to the fourth end, and wherein the second end and fourth end are separable when the second leg is not received in the major aperture and minor aperture;
       vii. a lock, wherein the lock is operable to govern the ability of the second leg to be removed from the major aperture and minor aperture; and
       viii. a processing unit in communication with a motion sensor and a radio, the radio enabling communication with the electronic device via the wireless network, the motion sensor configured to detect motion of the device, wherein the processing unit is configured to communicate information describing the motion of the device to the electronic device.

11. The system of claim 10, wherein the lock is in communication with the processing unit, and wherein the lock is operable via user input provided to the electronic device.

12. The system of claim 10, further comprising a position sensor, wherein the processing unit is configured to communicate data from the position sensor to the electronic device.

13. The system of claim 10, wherein a notification is output from the electronic device, the notification comprising data received by the electronic device from the processing unit.

14. The system of claim 10, further comprising a location sensor configured to detect the location of the device, wherein the processing unit is configured to provide data describing the location of the device to the electronic device.

15. The system of claim 10, further comprising a camera, wherein the processing unit is configured to provide image data recorded by the camera to the electronic device.

16. The system of claim 10, further comprising a vehicle immobilizer, wherein the vehicle immobilizer is operable by the processing unit.

17. The system of claim 10, further comprising a speaker, wherein the speaker is operable to produce sound by the processing unit.

18. The system of claim 10, wherein the lock bar is configured to engage with a vehicle control input of the vehicle so that the first leg and second leg extend through the vehicle control input to block between 0.1 and 360 degrees of rotation of the vehicle control input when the first leg is received in the lock aperture and the second leg is received in the major aperture and minor aperture.

19. The system of claim 10, wherein the minor cover is movable between an open position and a closed position.

* * * * *